Sept. 18, 1956 W. F. BLOOM 2,763,792
ELECTRICAL IMPULSE TIMING INSTRUMENT
Filed Oct. 16, 1952
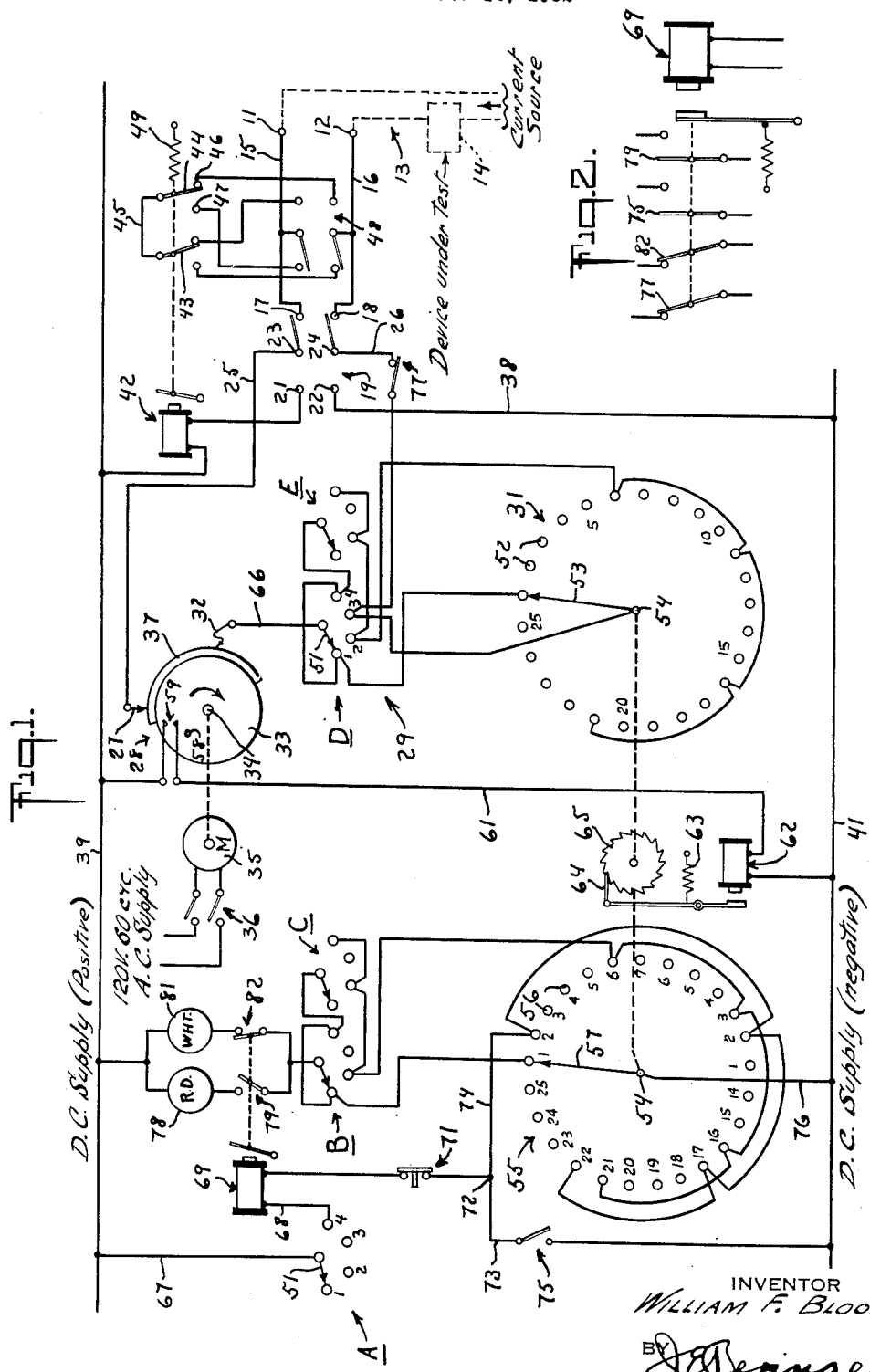
INVENTOR
WILLIAM F. BLOOM
BY
J. E. Beringer
His ATTORNEY

United States Patent Office 2,763,792
Patented Sept. 18, 1956

2,763,792

ELECTRICAL IMPULSE TIMING INSTRUMENT

William F. Bloom, Dayton, Ohio

Application October 16, 1952, Serial No. 315,130

14 Claims. (Cl. 307—132)

This invention relates to instruments for controlling the opening and closing of an external electrical circuit. Although not so limited, the invention has especial application to the testing of electrical devices such as relays.

The constant trend toward attaining higher speed operation of protective relays and auxiliary equipment has been apparent in the field of power transmission and distribution for many years. It has been the experience of those in the field that the testing of such relays and equipment by the application of current or potential does not always constitute a comprehensive test of the apparatus being inspected. In many instances, the fitness of a relay for service can be truly determined only by the application of energy for a short, definitely measured interval of time. The instant invention is aimed generally at the provision of an instrument designed to produce and accurately to measure electrical impulses for this and like purposes.

Another object of the invention is to produce a device which will control an external circuit in a manner best suited to the relay or piece of electrical equipment being tested or operated. A pre-determined time interval is established, for example one cycle of a 60 cycle current supply. In some instances it is desirable to close the external circuit once during each cycle. For other purposes it is desirable that the closed circuit be established at a frequency less than one cycle. In still other instances it is desirable that the device act a single time upon the external circuit and then continue to operate at synchronous speed but without producing a control operation until manually reset by the operator. Each of these three modes of operation can be selected and produced at will by the device being described. Further, the frequency of the control operation can be preselected, and, sitll further, the external circuit may be opened instead of closed in any of the three modes of operation described, all of these operations and the results produced thereby being a part of the object of this invention.

A further object of the invention is to incorporate impulse control apparatus as described in an instrument which is sturdy and reliable of adjustment, and which is small enough to be considered portable for purposes of field work. That is, the instrument is not confined to laboratory work but can be carried into the field and applied directly to the test problem at hand.

Still another object of the invention is to vary the duration of applied electrical impulses through a relatively wide range of fractional increments of a predetermined time interval, for example one second.

Other objects and structurural details of the invention will appear from the following description when read in connection with the accompanying drawings, wherein:

Fig. 1 is a diagrammatic view of the instrument in its illustrative embodiment, and Fig. 2 shows a structural detail of such instrument.

Referring to the drawings, the instrument which may be suitably constructed in portable form presents a pair of terminals 11 and 12 for attachment of the instrument in an external electrical circuit. Such a circuit is indicated at 13 and interposed in the external circuit is a device 14 to be tested. It will be understood that, in accordance with the purpose of the instrument, the establishing of an electrical connection between the terminals 11 and 12 results in the closing of the circuit 13 through the device 14 for such a time interval as the electrical connection between the terminals 11 and 12 is maintained.

The electrical interconnection between the terminals 11 and 12 is established by an internal circuit including leads 15 and 16 connected directly to the respective terminals 11 and 12. At the ends opposite the terminals 11 and 12, the leads 15 and 16 terminate in contacts 17 and 18. Such contacts are part of a switch unit 19 which further includes a pair of opposed contacts 21 and 22 and central contacts 23 and 24 permanently connected to the switch element. The switch unit 19, it will be observed, is of the two pole, double throw kind. Thus, it is adjustable selectively to connect the contacts 23 and 24 to the contacts 17 and 18 or to the opposing set of contacts 21 and 22.

The central, common, contacts 23 and 24 of the switch 19 represent the terminals of respective leads 25 and 26. The lead 25 is directly connected to a stationary electrical brush contact 27 forming a part of a rotary timing switch device 28. The lead 26 is indirectly connected, by way of a selector switch device 29 and a stepping switch device 31, to an adjustable or movable electrical brush contact 32 also forming a part of the rotary switch 28.

The rotary switch device 28 further comprises a disc 33 of insulating material mounted on a shaft 34 to rotate in a clockwise direction at a constant speed, for example, one revolution per second. Power for rotating the disc 33 is supplied by a synchronous motor 35 acting through suitable speed reducing gearing (not shown). As indicated, the motor 35 is connected to a source of 120 volt, 60 cycle alternating current, the supply of which is controlled by a manually operated switch 36. A segment 37 of conducting material is rigidly attached to the periphery of the disc 33. This segment extends along the circumference of the disc in an arc of slightly less than 180°. The electrical brush contact 27 is in such overlying, adjacent relation to the periphery of the disc 33 as to be engaged by the segment 37. The movable electrical brush contact 32 is similarly mounted and is adjustable in its relation to the fixed contact 27 so as to occupy a position nearer to or more distant from the fixed contact in an arcuate or circumferential sense. The movable brush contact may be adjusted forward or backward through a path extending from a point directly over the fixed contact 27 to a point diametrically opposite the fixed contact.

It will thus be seen, that, when the disc 33 and its attached segment 37 are rotated, an electrical circuit will be closed between the contacts 27 and 32 for so long as both brushes are in contact with the segment. The duration of this interval of contact depends on both the relative position of the brushes and the speed of rotation of the disc, and since the speed of rotation of the disc is held constant, the duration of such interval of contact will depend entirely on the relative position of the brushes 27 and 32 as determined by the position of the movable one thereof. The segment 37 extends for an arc of slightly less than 180° because of the finite thickness of the brushes and in order to prevent a circuit from being established twice during one revolution of the disc when the brushes are in position diametrically opposite one another. The principle of operation of the rotating switch is not affected by the rate at which it is rotated, nor, of course, by the direction of rotation. A speed of one revolution per second is selected by way of convenience and for illustrative purposes.

Assuming the switch unit 19 to be set to engage the contacts 17 and 18 then a circuit is closed through the terminals 11 and 12 by way of the electrical brush contacts 27 and 32. The apparatus tends, therefore, electrically to connect the terminals 11 and 12 once during each revolution of the disc 33 and for a period of time determined by the relative position of the brush contacts 27 and 32. The rotary switch device 28 thus tends intermittently to open and close the external circuit 13, the frequency of the electrical impulses being a function of the selector switch 29 and stepping switch 31, as will hereinafter be seen.

The set of contacts 21 and 22, of the switch unit 19, is in a lead 38 extending across and interconnecting positive and negative conductors 39 and 41 of a direct current supply suitably provided in the instrument, as by a small rectifier operating from the A. C. supply used to drive the motor 35. Also in the lead 38 is a relay 42 attracting an armature assembly including a pair of movable contact arms 43 and 44. The contact arms 43 and 44 are electrically interconnected by a conductor 45. Each, moreover, makes alternate contact or engagement with a pair of contacts 46 and 47. These in turn are connected to a two pole double throw reversing switch 48 permanently connected across the leads 15 and 16. The contact arms 43 and 44 are normally urged by a spring 49 to a position of engagement with respective contacts 46. Upon energizing of the relay 42 the contact arms are moved out of this position and into a position of engagement with the contact 47.

It will be understood that the switch 19 functions as a control switch. Set to the illustrated position, in engagement with contacts 17 and 18, it places the external electrical circuit 13 directly under the control of the rotating switch device 28. Set to the alternate position, in engagement with contacts 21 and 22, it closes a supplemental circuit through the relay 42 and shifts the contact arms 43 and 44 to alternate positions of adjustment. These contact arms and associated parts represent an alternate means of closing the external circuit 13 and is provided because of its ability to handle a heavier current than could be handled by the contacts of the rotating switch and also to provide for a reverse mode of operation. That is, instead of having the external circuit 13 normally opened and intermittently closed, it may be normally closed and intermittently opened, either mode of operation being selected by adjustment of the reversing switch 48. Thus, with the switch 48 set in the position illustrated, the circuit across leads 15 and 16 is normally open and is closed only when the contact arms 43 and 44 move to their alternate position of adjustment in response to the energizing of relay 42. Set to its other position of adjustment, however, the switch 48 causes the circuit across leads 15 and 16 to be normally closed and such circuit is intermittently opened by the movement of the arms 43 and 44.

It will still further be understood that when the external circuit 13 is under the control of the relay 42, in the supplemental internal circuit, the timing of the impulses remains a function of the rotating switch 28 since such switch is included in the supplemental circuit by virtue of its attachment to the contacts 23 and 24 of the switch 19. Thus, the relay 42 is energized and deenergized for greater or lesser periods during each revolution of the insulated disc 33 with the result that in conjunction with springs 49 the arms 43 and 44 are moved to alternate positions of adjustment during each revolution of the disc 33 or each cycle of operation as such periods may be termed.

The previously referred to selector switch 29 and stepping switch 31 are used to select the rate of repetition with which the devices above described will act on the external circuit 13. The selector switch actually consists of five units A, B, C, D and E operated on a common shaft, each unit consisting of a contact arm 51 and four contact points 1, 2, 3 and 4. The stepping switch comprises a rotary series of contacts 52 and an arm 53 which traverses the series of contacts 52 by moving successively from one to another in a clockwise direction as viewed in the drawing. There are twenty five contacts 52 in the illustrated instance. The arm 53 is attached to a rotatable shaft 54, common also to a second stepping switch 55 made up of a series of contacts 56 and an arm 57.

The arms 53 and 57 of the stepping switches 31 and 55 are moved in index fashion by an intermittent rotation of the shaft 54 under the control of and in response to operation of the rotating switch 28. Thus, a piece of material 58 on the face of the disc 33 operates in a cam-like fashion momentarily to close a pair of contacts 59 in a lead 61 extending across the conductors 39 and 41. Also in the lead 61 is a relay 62 which in conjunction with a spring 63 effects to and fro motion of a pawl 64 in cooperative engagement with a ratchet 65 on the shaft 54. It will be apparent that a circuit is closed through the relay 62 once during each cycle of movement of the switch 28. Thus, the shaft 54 is turned one step in a clockwise direction during each cycle of operation of the switch 28 and the arms 53 and 57 are moved in response thereto to engagement with the next succeeding contact 52 or 56.

The selector switch units D and E are interconnected with one another and with selected points or positions of the stepping switch 31. These connections are self evident from the drawings. Generally, however, it may be seen that position 1 of the selector switch unit D is connected to position 1 or the first contact of switch 31, and is connected also to position 4 of the switch unit D and to the switch arm 51 of the switch unit E. Position 2 of switch unit D is connected to positions 6, 11, 16 and 21 of the switch 31 as well as to positions 2 and 4 of unit E. Position 3 of selector unit D is connected to the arm 53 of the switch 31 as well as to the lead 26 extending from the control switch 19. Position 4 of selector unit D is connected only as before described. The arm 51 of selector unit D is connected by lead 66 with the movable electrical brush contact 32 of the switch device 28.

With the above described parts in the position illustrated, a circuit may be traced from one side of the switch 19 by way of the lead 25 to the stationary brush contact 27, segment 37 and brush 32 of the rotating switch to the arm 51 of switch unit D and from there through contact number 1 of the stepping switch 31 through the arm 53 thereof to the lead 26 and back to the opposite side of the switch 19. If it is assumed that the disc 33 is rotating, then it is obvious that the circuit thus traced will be broken an instant later by the separation of segment 37 and electrical brush contact 27. Next in order is the operation of the set of contacts 59 which cause the arm 53 of the relay 31 to advance to contact point 2 of the series of contacts 52. Now, when the rotating switch has completed a revolution the brush contacts 27 and 32 will again be bridged by the segment 37. An attempt to retrace the circuit as described above will indicate an open circuit at point 1 of the stepping switch because the arm 53 is now at rest on point 2. After twenty five revolutions of the rotating switch the arm of the stepping relay will again be at rest on position 1 and a complete circuit may be traced as above described. If a similar analysis of the circuit is made with the selector arm 51 of the unit D on position 2 and 3 it will be seen that a complete circuit may be traced between the opposite side of the control switch 19 during every fifth revolution and every revolution of the disc 33, respectively. Position 4 of the selector switch is used in a modified manner of operation described below.

Thus, position 4 of the selector unit is utilized to initiate a one time or single action energizing or deenergizing of the external electrical circuit. Referring to the selector unit A, the arm 51 thereof is connected by a lead 67 to the positive conductor 39 of the supplemental internal circuit. Position 4 of the unit A is connected indirectly in the following manner to the opposite side of the supplemental circuit or to conductor 41. There extends from position 4 of unit A a lead 68 in which is interposed a relay 69 and a reset switch 71 and which terminates at a point 72. From the point 72 parallel leads 73 and 74 extend. The former is connected to the conductor 41 by way of a normally open switch 75. The latter is connected to the conductor 41 by way of contact points 2, 7, 12, 17 and 22 of the stepping switch 55 and the arm 57 thereof, the latter being directly connected through a lead 76 with conductor 41. With the arm 51 of the selector switch in its No. 4 position a circuit will be closed through the relay 69 when the arm 57 of the stepping switch 55 reaches the first of the identified positions, Nos. 2, 7, 12, 17 and 22. The energizing of relay 69 effects motion of an armature assembly of which the switch 75 is a part. The normally open switch 75 thus is closed in response to energizing of the relay 69. This switch now bridges the portion of the relay circuit which passes through the stepping switch 55 and so prevents the relay 69 from being deenergized when the arm of the stepping switch moves to the next contact. That is, the relay circuit is locked in a closed position and the stepping switch 55 is rendered ineffective to open or close such circuit. Also forming a part of the armature assembly influenced by the relay 69 is a switch 77 interposed in the lead 26 extending from one side of control switch 19. The switch 77 is normally closed but in response to energizing of the relay 69 moves to an open position. As a result, the circuit through the control switch 19 is opened and the timing apparatus is rendered ineffective with respect to the terminals 11 and 12 and the external circuit 13 attached thereto.

The relay circuit is manually opened or reset by operation of the reset push button 71. After the relay circuit is reset, the switch 77 will close and the switch 75 will open. This condition of the parts will prevail until the arm of the stepping switch 31 reaches a point 1, 6, 11, 16 or 21, depending on the position in the indexing sequence at which the relay 69 is reset. When the arm of the stepping switch reaches the first one of these positions one control operation of the apparatus results. Immediately following this control operation, and as a part of the same revolution of the switch 28, the stepping switch advances to the next indexing position, wherein the arm 57 of switch 55 will engage a position 7, 12, 17 or 22. Accordingly, the circuit is again closed through the relay 69 and the switch 75 is closed and the switch 77 is opened with the result as before described.

It is desirable that the relay 69 be not reset at such time as the arm of stepping switch 31 is on any one of the positions 1, 6, 11, 16 or 21, in which position a control operation would result. So that the operator may know at what times the stepping switch reaches these positions, one of two lamps is caused to light. With the relay 69 energized an indicating circuit is connected to a red lamp 78 through a switch 79. When the relay 69 is open or rest the indicating circuit is transferred to a white lamp 81 by the opening of the switch 79 and the closing of another switch 82, the switches 79 and 82 being a further part of the armature assembly shown in Fig. 2 as operating under the influence of the relay 69.

The red lamp 78 and the white lamp 81 are thus alternately used according to whether the relay 69 is energized or deenergized. In operation of the apparatus when the relay 69 is deenergized the white lamp 81 will light when the stepping switch reaches its first control producing position, and upon each succeeding control producing position. When the selector arm 51 is adjusted to its No. 4 control position and the relay 69 is brought into the circuit, the red lamp 78 will be used.

The sections or units B and C of the selector switch device 29 are used to control the signal lamps 78 and 81. The arm 51 thereof has a common connection to the lamp by way of the switches 79 and 82. These units, moreover, are wired or connected to the contact 56 of the stepping switch 55 in the same manner that corresponding positions of the units D and E are connected to the contact 52 of the stepping switch 31. This causes the selected lamps to light during the cycle of operation of the rotating switch 28 in which a control operation is produced. In the case of the red lamp circuit, therefore, the lighting of the red lamp gives warning that the next operation of the instrument is to be a control operation and means that the operator should not at that moment push the reset button 71.

What is claimed is:

1. An instrument for controlling the opening and closing of an external electrical circuit, including a pair of terminals, a first switching device for intermittently opening and closing a circuit between said terminals, said device including cyclic means moving through successive operational cycles, a second switching device for intermittently opening and closing a circuit between said terminals, said second device including an intermittently energized and deenergized relay, a control switch setable to alternate positions of adjustment selectively to connect said terminals, said switch acting in one position to connect said cyclic means directly to said terminals and acting in another position to place said cyclic means in series relation to said relay.

2. An instrument for controlling the opening and closing of an external electrical circuit, including a pair of terminals, respective conductors extending from said terminals, other conductors representing continuations of the first said conductors, a switch element connected to said other conductors and adjustable to alternate positions of adjustment, in one of which it is engaged with the first said conductors, a rotary switch device connected to said other conductors and operable intermittently to close a circuit between said other conductors, and another switch device effective in response to adjustment of said switch element to the other of its alternate positions of adjustment to close a circuit through the first said conductors, said other switch device effecting intermittent closing of said last named circuit in response to operation of said rotary switch device.

3. An instrument for controlling the opening and closing of an external electrical circuit, including a pair of terminals for attachment of the external circuit to the instrument, a pair of conductors in said instrument representing a supplemental, continuously energized electrical potential, a relay interposed between said conductors and energized thereby, a switching device settable by the energizing and deenergizing of said relay to alternate positions of adjustment electrically interconnecting and disconnecting said terminals, a switch element in series relation to said relay and operable when closed to energize said relay, and another switching device brought into series relation with said relay in the closed position of said switch element effecting intermittent closing and opening of the circuit through said relay.

4. An instrument according to claim 3, characterized in that said other switching device includes a rotary element turning at a constant speed, an electrically conductive segment on said rotary element, and brush contacts electrically bridged by said segment during the interval of turning motion of said rotary element in which both said brush contacts engage said segment.

5. An instrument for controlling the opening and closing of an external electrical circuit, including a pair of terminals for attachment of said instrument in the external circuit, a switching device settable to alternate positions of adjustment to close and open the circuit through said terminals, a supplemental electrical circuit in said instrument including a relay effecting alternating adjustment of said switch device in response to energizing and deenergizing thereof, a rotating switch device including an intermittently bridge pair of contacts, and a control switch settable to a first position closing said pair of contacts in series with said terminals and settable to a second position closing said contacts in series with said relay, said control switch opening the supplemental circuit through said relay in moving from said second to said first position.

6. An instrument according to claim 5, characterized by a manually adjustable reversing switch between the first said switching device and said terminals.

7. An instrument for controlling the opening and closing of an external electrical circuit, including a pair of terminals for attachment of said instrument in said circuit, an internal circuit between said terminals including in series arrangement an intermittently opened and closed switch and another switch adjustable to positions opening and closing said internal circuit and normally occupying one of said positions, a supplemental internal circuit including a relay, said other switch being movable by energizing of said relay to the other one of its said positions, a stepping switch operating in synchronism with said intermittently operating switch, certain positions of said stepping switch being connected in series with said relay whereby to close said supplemental circuit through said relay in said certain positions of said stepping switch, a holding circuit energized in response to the energizing of said relay to hold the circuit through said relay closed irrespective of the position of said stepping switch, and a manually operable switch in said supplemental circuit to render the described devices in said supplemental circuit alternatively effective and ineffective.

8. An instrument according to claim 7, characterized by a signal light in said supplemental circuit in series relation to positions of said stepping switch in respectively preceding relation to said certain positions, and a switch operated by and in conjunction with said manually operable switch for closing and opening said supplemental circuit through said signal light.

9. An instrument according to claim 7, characterized by manually operable reset means for opening said holding circuit irrespective of the position of said manually operable switch.

10. An instrument for controlling the opening and closing of an external electrical circuit, including a pair of terminals for attachment of said instrument in said circuit, an internal circuit interconnecting said terminals and including a rotary switch turning at a constant speed intermittently opening and closing said internal circuit, another switch in said internal circuit adjustable to positions opening and closing said internal circuit and normally occupying one of said positions, a supplemental internal circuit including a stepping switch adjusting to successive index positions in correspondence with motion of said rotating switch through successive predetermined degrees of rotary movement, certain of said index positions being connected in said supplemental circuit, relay means in said supplemental circuit operable when energized to move said other switch to the other one of its said positions, a selector switch adjustable to close the supplemental circuit through said relay means in the said certain positions of said selector switch, and a holding circuit including a switch element connected to and movable with said other switch for holding said relay means energized through positions of adjustment of said stepping switch successive to the first encountered one of said certain positions, and manually operable reset means for opening said holding circuit.

11. An instrument according to claim 10, characterized by another stepping switch in series relation to said rotating switch in the first said internal circuit and adjusting in synchronism with the first said stepping switch, index positions of said other stepping switch being connected in said internal circuit which occupy respectively preceding relation to the corresponding said certain positions of the first said stepping switch.

12. An instrument for controlling the opening and closing of an external electrical circuit, including a pair of terminals, a cylindrical member, means for rotating said member at a constant speed, an electrically conductive segment fastened to said cylindrical member and extending over a portion of the circumference thereof, a pair of electrical brush contacts in the path of movement of said conductive segment, said contacts being connected to respective terminals so that a circuit is closed through said contacts during that part of each revolution of said cylindrical member in which both said contacts are in engagement with said segment, an adjustable mounting for one of said contacts whereby it may be moved closer to or more distant from the other one of said contacts correspondingly to increase and to reduce the time interval in which the circuit is closed through said contacts, and selective switch means in series relation to one of said electrical brush contacts selecting certain only of the revolutions of said cylindrical member in which the circuit is closed through said contacts.

13. An instrument for controlling the opening and closing of an external electrical circuit, including a pair of terminals, a stepping switch having a common contact connected to one of said terminals and a series of contacts connected successively to said common contact by an indexing operation of said stepping switch, means for effecting successive indexing operations of said stepping switch, a selector switch including a plurality of relatively stationary contacts connected to respective contacts or groups of contacts in the series of contacts of said stepping switch, and further including a movable contact selectively engageable with said stationary contacts and connected to the other one of said terminals, means for supplying intermittent electrical impulses to said movable contact, and a rotating switch interposed between said selector switch and said other terminal, including a pair of relatively adjustable switch contacts and electrically conductive means for closing a circuit through said pair of contacts during a portion of each rotary movement of said rotating switch.

14. Electrical pulse generating means, including a cylindrical part rotating at a constant speed, an electrically conductive segment extending approximately one-half the distance about the periphery of said part and rotating therewith, brush contacts arranged to be bridged by said segment during a part of each revolution of said part, a circuit closed by the bridging of said contacts, means for varying the duration of the pulse transmitted by said circuit within a range covering fractions of the time required for said part to complete one-half revolution, and selector switch means in said circuit providing for closing of said circuit upon preselected certain ones only of the revolutions of said part.

References Cited in the file of this patent

UNITED STATES PATENTS

| | | |
|---|---|---|
| 1,637,080 | Kesses | July 26, 1927 |
| 2,138,668 | Stewart | Nov. 29, 1938 |
| 2,441,226 | Phillips et al. | May 11, 1948 |
| 2,442,497 | Kelk | June 1, 1948 |